Aug. 20, 1968  N. H. BOROSON  3,397,712

VALVE HAVING A RUPTURABLE SEAL ASSEMBLY

Filed Dec. 19, 1962

INVENTOR.
N. HARVEY BOROSON

BY Thomas N. Brennen

United States Patent Office 3,397,712
Patented Aug. 20, 1968

3,397,712
VALVE HAVING A RUPTURABLE
SEAL ASSEMBLY
Norman Harvey Boroson, Succasunna, N.J., assignor to Thiokol Chemical Corporation, Bristol, Pa., a corporation of Delaware
Filed Dec. 19, 1962, Ser. No. 245,746
8 Claims. (Cl. 137—68)

ABSTRACT OF THE DISCLOSURE

A valve having a rotating ball-type flow control element also contains a novel hermetic seal which provides a non-penetrable seal or barrier to a corrosive fluid in the flow system during storage thereof. The barrier is easily replaceable and in operation is ruptured, upon initiation of fluid flow through the system containing the valve by rotation of said ball element.

Figure 1:
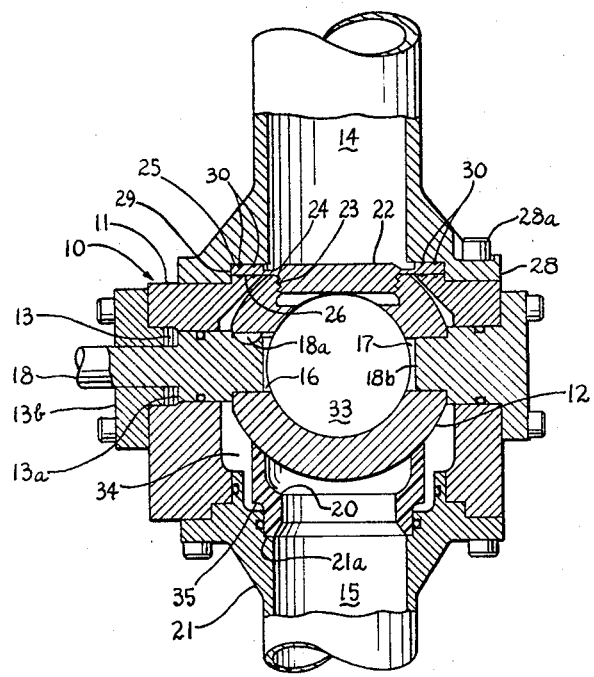

This invention relates to rotating spherical element, or "ball" valves, and more particularly to an improvement in such valves wherein the ball, which contains a passageway to permit the flow of fluid therethrough and is rotated to bring the passageway into registration with inlet and outlet ports in the valve body is isolated from the fluid upstream thereof even though said fluid is under very high pressures.

In the usual device of this sort the ball is fitted with a slot or opening which receives the end of a rotating rod or shaft. The shaft extends exteriorly of the valve and is rotatably propelled by a suitable actuation means. The ball thus rotated has the passageway therein brought into registration with the valve inlet and outlet, and by suitably controlling the rotational speed thereof, the valve may be utilized as a fluid metering and control device. It thus finds widespread use in fluid systems of every description.

Sealing on reclosure of these valves is accomplished in most instances by means of a seal of resilient material of generally annular or circular form fixed to or held in the valve body. The annular seal is usually in contact with the body of the ball and shaped to cradle it therein. In addition, it is biased against the ball by a spring, fluid pressure, or other biasing means well known in the art. As the ball is rotated the seal is constantly in contact with the outer periphery thereof.

However, while such sealing devices are adequate during operation of the valve under normal use and in ordinary fluids, there is no provision for isolating the internal portions of the valve from fluids which are reactive and/or corrosive; especially during long term storage. As an example, under certain conditions and uses, e.g., fire fighting sprinkler systems, rocket motor stand-by systems, aircraft escape systems and the like, the valve internal parts experience "soaking" in the fluid to be controlled (unless a separate fluid control device is used to prevent this) which would in time corrosively damage these parts and interfere with proper operation of the valve. In other instances mechanical barriers are used which must be physically detached from the line prior to use of the downstream system.

It is therefore the object of this invention to create an improvement in valves of this type wherein the internal parts are isolated from the fluid to be controlled during storage, even though said fluid is under high pressure, without interfering with its normal operating function. This is accomplished by providing in the inlet thereof a hermetic barrier in the form of a diaphragm, which is affixed to both the valve body and the spherical element or ball.

Another object of this invention is to provide a hermetic seal for a ball valve of the character described which is further capable of withstanding high pressure when applied from either the upstream or downstream section of the system in which the valve is employed with no deleterious effect on the seal.

Other objects of the invention will become apparent from the following description and claims and illustrated in the accompanying drawings which disclose a preferred manner of applying its principle.

Figure 2:
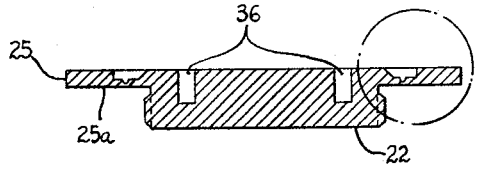

In the drawings:
FIGURE 1 is a sectional view of the invention, with the valve in the closed and "hermetically" sealed position.
FIGURE 2 is an elevational view of a hermetic diaphragm of the type contemplated in the invention, and
FIGURE 3 is a magnified view of the encircled portion of the diaphragm of FIG. 2.

Referring to the drawings there is shown a valve 10 having a body 11, a generally spherical element or ball 12 having a fluid passageway 33 therethrough, thrust bearing assembly 13, inlet port 14 and outlet port 15. The ball 12 has an opening 16 of generally cylindrical shape on one side thereof for reception of drive shaft 18 which engages opening 16 through key 18–a. On the opposite side is a second opening 17 for reception of shaft stub or cap 18–b. Ball 12 is thus supported during rotation by shaft 18 and the end of stub 18–b. Thrust bearing 13 bears against shoulder 13–a on shaft 18 and is held thereagainst by flange 13–b.

In the outlet port 15 is a seal 20 which is held in body 11 by flange 21 and internal shoulder 21–a thereof. Opposite reclosure seal 20 is a rupturable or shearable hermetic barrier or diaphragm 22 which is comprised of any substance, e.g., aluminum, magnesium and titanium, chosen for its resistance to corrosive fluid action and positioned in ball 12 by threads 23, which engage with mating threads in ball recess 24. Diaphragm 22 (FIG. 2) has a peripheral flange 25 and is threaded into recess 24 until surface 25–a of flange 25 abuts face 26 of body 11. Face 26 is shown with a pair of concentric V-grooves, which can be used any number as desired. Flange 25 is held in place by inlet flange 28 in recess 29 thereof. Recess 29 has concentric pointed protuberances or ridges 30 for aiding in retaining flange 25 of diaphragm 22. Bolts 28–a pass through flange 28 and thread into body 11. When bolts 28–a are tightened, protuberances or ridges 30 pierce the material of diaphragm 22 and force it into the V-grooves in face 26 of body 11, to effect an external seal.

Figure 3:
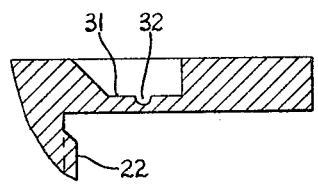

Referring to FIGURE 3 there is shown in enlargement, a portion of rupturable diaphragm 22, illustrating web 31 with concentric furrow in the form of a notch, score or undercut 32.

In operation of the invention herein set forth, when spherical element 12 is rotated by shaft 18, diaphragm 22 is caused to break under a combination of tensional and shearing forces along furrow or score 32 due to the minimal thickness of the material thereat. Continuation of rotation of shaft 22 causes ball 12 passageway 33 to come into registration with inlet 14 and outlet 15 and fluid flow therethrough commences. In addition, the pressure thereof acts in chamber 34, against shoulder 35, to urge reclosure seal 20 against ball 12 in sealing relationship. Upon return of ball 12 to its original position, pressure in chamber 34 continues to act on seal 20 to effect fluid flow shut-off.

Thus it is seen that through use of the invention herein described an improved, hermetically sealed valve is achieved, which permits long term storage of highly reactive and/or corrosive fluids. In addition, by providing threads on diaphragm 22 for engagement with those in recess 24 of ball 12, easy replacement thereof is achieved.

For this purpose, receptacles 36 (FIG. 2) are provided so that a spanner wrench or similar tool can be applied thereto, and diaphragm 22 removed after use. Following this, flange 25, now broken away from diaphragm 22 is easily removed by disassembling flange 28 from body 11. A new diaphragm 22 is then inserted and the valve reassembled.

As indicated hereinbefore this invention has primary use in fluid systems which, because of the reactive materials being utilized therein, must have some means to separate the reactive fluid from downstream components which themselves must be capable of reliably operating after being stored for long periods. As stated, a prime example of such use is in storable propellant rocket motor systems in stand-by missiles. Such missiles are frequently stored with their propellants under high pressure on the order of 1000 pounds per square inch and higher. It is under such conditions coupled with the use of highly reactive propellants, that the valve of this invention finds broadest use. In addition, high pressures are sometimes generated on the downstream side of barrier 22 (as, for instance, during prelaunch downstream component pressure check) and tend to cause premature rupture thereof. However, the invention herein, by its unique arrangement of parts and selection of material, overcomes this disadvantage. This is accomplished by selecting material for use in fabricating diaphragm 22, especially in web portion 31, which is flexible and capable of undergoing relatively large deflection before severing.

To illustrate this last mentioned capability, when pressure is applied to diaphragm 22 through inlet 14, valve ball 12 shifts or deflects, ever so slightly in the drownstream direction. This deflection is apparent since ball 12, shaft 18 and shaft stub 18–b constitute a beam, fixed at both ends and centrally loaded. Any beam so loaded will deflect in the direction of the load, and in the most flexible section. In the instant case this is in web 31. Hence a hermetic seal, or means for maintaining physical separation of fluid such as is present at inlet 14 from the downstream regions of a system using valve 10, is achieved. Similarly, when downstream conditions are such that pressure thereat rises, a deflection again occurs but in the opposite direction. And, as before, this deflection will occur in web 31. In actual tests, wherein the diaphragm 22 (and hence web 31) were subjected to alternate upstream and downstream pressurization, it has been found that the hermetic seal was capable of being maintained, even when the pressure was in excess of 1000 p.s.i. It was observed further, that while aluminum appears best for accomplishing the task, titanium and magnesium also function well.

Having described the invention and its operation, what has been achieved thereby is a hermetically sealed fluid flow control device which permits easy replacement of the hermetic means, is highly useful in reactive and/or corrosive fluids and, an advantage of no mean consequence, can be used in high or low pressure systems with ease.

The invention finds ready application in a broad range of fluid systems but, as stated, its principal use is in systems wherein corrosive action on valve internal parts is to be avoided. A primary example of this is in liquid propellant rocket engine systems, specifically those which must remain ever "at the ready" while in storage for long periods before being called upon to operate. This again is a unique feature of the invention herein described, as this capability is provided by the novel use of barrier or diaphragm 22, which, in conjunction with the rotation of ball 12 to its position of registration with inlet 14, outlet 15 and passageway 33 to permit full fluid flow therethrough is rupturable. Hence corrosive fluids, which are usually used as propellants, are prevented from moving downstream until the instant of use.

Having thus described the invention and its operation, it will be understood that it is to be limited in scope in the practice thereof only by the foregoing specification and the scope of the subtended claims.

What is claimed is:

1. A valve comprising a valve body having a fluid passage therethrough, a valve element rotatably supported in said passage for movement about an axis extending transversely through said passage and between closed and open positions, a frangible sealing member extending across said passage on one side of said axis to hermetically seal said passage, said sealing member having a portion threadedly securing said member on said valve element and being mounted in sealing engagement with said body, said sealing member being responsive to movement of said valve element between closed and open positions to rupture and thereby open said passage to control by said valve element.

2. In a valve for fluid systems having a body and conduit means therein defining at least one fluid inlet and at least one fluid outlet connectable to said system, a rotatable, substantially spherical flow control element having a fluid passageway therethrough and a threaded recess in the outer surface thereof, and means for rotating said element, the improvement comprising, a removable hermetic seal in said valve having a threaded portion adaptable for engagement with said threaded recess in said element, a peripheral flanged portion surrounding said threaded portion and in sealing engagement with said body and means defining a rupturable web in said seal connecting said threaded and flanged portions thereof, said seal positioned in said fluid inlet between said inlet and said rotatable element whereby rotation of said element ruptures said seal in said web and said passageway is registrable with said inlet and outlet to permit fluid flow through said valve.

3. In a valve for fluid systems comprising a housing having at least one fluid inlet port and at least one fluid outlet port, a rotatable, substantially spherical flow control element having a fluid passageway in said housing, said passageway rotatably registrable with said inlet and outlet ports, means on said housing for connecting said ports to said fluid system, the improvement comprising:
    means defining a threaded recess in said element;
    a rupturable hermetic barrier for preventing contact of fluid from said system with said valve interior having an outer flange and a threaded portion, said barrier sealingly attached to said housing at said barrier flange between said element and at least one of said ports and attached to said element by engagement therewith of said threaded portion;
    means for rotating said element; and
    said barrier being ruptured in response to rotation of said element by said rotating means and said passageway is registrable with said inlet and outlet ports to permit fluid flow through said valve.

4. The valve of claim 3 wherein the hermetic barrier includes a connecting web between said threaded portion and said outer flange.

5. The valve of claim 4 wherein the connecting web contains a concentric furrow.

6. A hermetically sealed valve for fluid systems comprising a body, a rotatable spherical element centrally positioned in said body having a fluid passageway therethrough and a threaded recess in the outer surface thereof, primary sealing means in said valve body contacting said element in sealing relationship therewith, means defining at least one fluid inlet and at least one fluid outlet in said body, means for connecting said fluid inlet and said fluid outlet in said fluid system, means connected to said element for rotation thereof to bring said passageway in said element into registration with said fluid inlet and said fluid outlet in said body, and a rupturable diaphragm sealingly positioned in said inlet between said fluid system and said element for preventing fluid from entering said valve interior comprising:
    an outer flange in sealing engagement with said body, a threaded portion, said threaded portion threadedly connected to said element in said threaded recess, and a relatively thinner portion surrounding said threaded portion connecting said flange thereto, said diaphragm rupturable in said thinner portion upon rotation of said element by said rotating means.

7. The valve of claim 6 wherein said thinner portion is a connecting web.

8. The valve of claim 7 wherein the thinner portion contains a concentric furrow.

References Cited

UNITED STATES PATENTS

| 3,219,047 | 11/1965 | Kircher et al. | 137—68 |
| 3,223,100 | 12/1965 | Koenig et al. | 137—68 |
| 3,039,482 | 6/1962 | Goldberg | 137—68 |

WILLIAM F. O'DEA, *Primary Examiner.*

R. GERARD, *Assistant Examiner.*